W. X. STEVENS.
Horse Hay-Rakes.

No. 147,702. Patented Feb. 17, 1874.

WITNESSES.
Moses Hobbs
Josiah Hobbs

INVENTOR.
William X. Stevens.

UNITED STATES PATENT OFFICE.

WILLIAM X. STEVENS, OF EAST BROOKFIELD, MASSACHUSETTS.

IMPROVEMENT IN HORSE HAY-RAKES.

Specification forming part of Letters Patent No. 147,702, dated February 17, 1874; application filed August 12, 1873.

*To all whom it may concern:*

Be it known that I, WILLIAM X. STEVENS, of East Brookfield, in the county of Worcester and State of Massachusetts, have invented a Horse Hay-Rake, of which the following is a specification:

The object of my invention is to hang and support the rake-teeth, which are not intended to be spring-teeth, so that they shall give back and rise over any obstacle that their points cannot dodge, but shall not be caused to give back or rise up by the weight or thrust of the hay which is being raked, and so that the hay shall be freely dropped when the rake is raised for that purpose; also, to hang the tooth-supporting frame C F E, so that, by the working of the hand-lever J, said frame and the rake-teeth may be raised and lowered, and locked in raking position.

Figure 1:
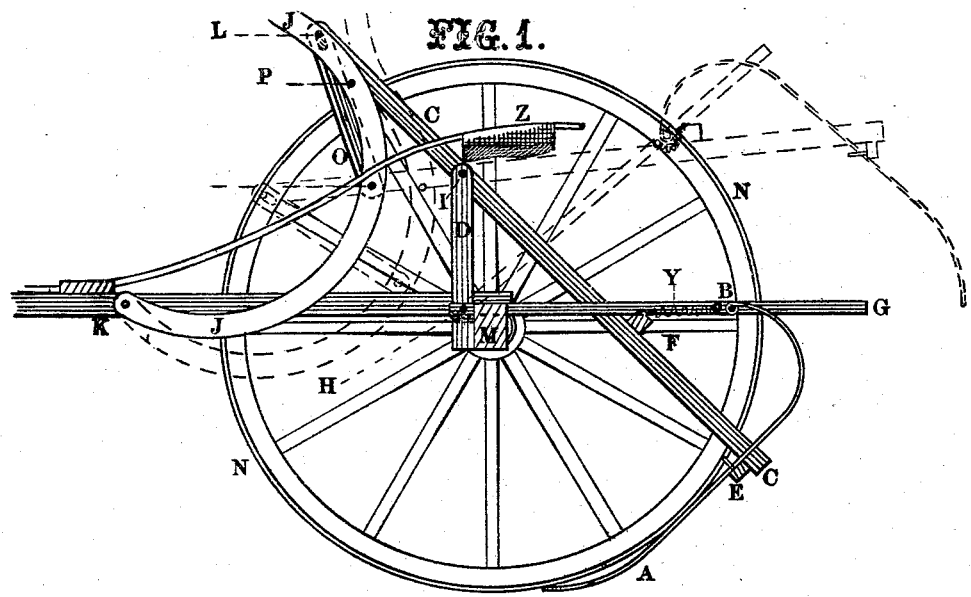
Figure 2:
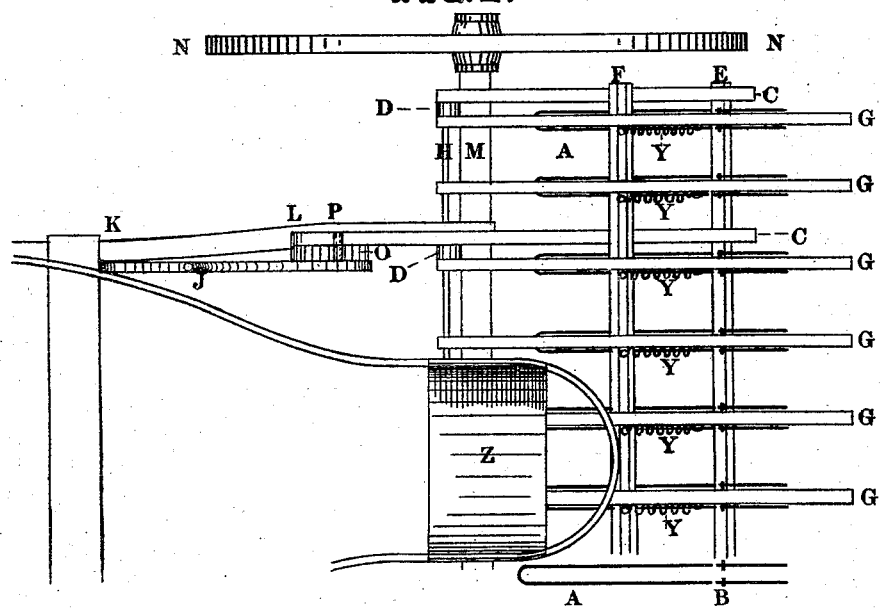

Figure 1 is a side elevation part in section, and Fig. 2 is a plan or top view of a part of a rake according to my invention.

N represents a wheel; M, the axle; and K the shafts firmly secured to the axle, forming, with the usual cross-ties, the frame which supports and carries the rake. Z is the driver's seat. The teeth A of the rake are made of wire, doubled back so as to form rounded points, whose breadth is lateral to the line of travel. The two ends of the wire, forming the tooth A, are hung loosely by a pivot, B, to hanger-bar G, so that the tooth may swing freely in a longitudinal vertical plane, and vibrate laterally at its point, a distance nearly equal to the space between two teeth. Hanger-bar G, pivoted to the main frame by means of bolt H, swings vertically in a notch across axle M, by which it is retained in position laterally, and is supported midway upon a cross-bar, F, to which it is connected by a spiral spring, Y. D D are posts secured to the axle M, and serve as bearings, at their lower ends, to bolt or rod H, and at their upper ends by bolts I to braces C. The tooth A is supported near its middle by bar E, across which bar the tooth slides freely, being loosely confined thereto by means of a staple. Bar E is secured to braces C, and, with F, forms the tooth-supporting frame C F E. Hand-lever J, pivoted to the main frame at K, is connected to one of the braces C by means of a bolt, L, and slotted link O. On the side of lever J stands a stud, P, upon which rests the upper end of brace C, thus resisting the tendency of the frame C F E to rise to the rear from the thrust of hay gathering on the teeth A.

To discharge the load of hay from the rake, the operator pulls hand-lever J (the top of which is not shown in Fig. 1) to the rear; the slot in link O allowing lever J to recede far enough to relieve stud P from bearing beneath brace C, finally engages bolt L, causing the frame C F E to rock on bolts I till the parts reach the position shown in dotted lines. As tooth A, with its hanger-bar G, swings upon bolt H, and the supporting-frame C F E swings upon bolt I, at a distance from H, the positions of bars F and E are so changed, relative to hanger G and tooth A, that the angle between said tooth and hanger is widely opened by the act of raising the tooth, thus allowing the hay to drop freely. By pushing lever J forward all parts are returned to position for raking. Bar E is placed below the region of the teeth, where the center of a full load rests, and supports the load on the teeth, while the teeth are allowed freedom to swing from side to side as their rounded points strike, and dodge between obstacles, and to slide across the bar to rise over obstacles which they cannot dodge, while spring Y assists the weight (which is not always sufficient) of hanger G and tooth A to keep the tooth to the ground. Spring Y, having one end attached to supporting-bar F, may have its other end attached to bar G at a point either forward or back of bar F. In the first position it resists, in the second it assists, raising the rake over a windrow.

I claim as my invention—

1. In combination with the independently-hinged hanger-bars G and pivoted teeth A, the lifting and supporting frame, consisting of braces C, lifting-bar F, and supporting bar E, substantially as described.

2. In combination with the subject-matter of the previous claim, the spring Y, as described.

3. The combination of hand-lever J, link O, and stud P with supporting-frame C F E, as described, and for the purpose specified.

WILLIAM X. STEVENS.

Witnesses:
   MOSES HOBBS,
   JOSIAH HOBBS.